Oct. 8, 1957  S. GABRIELSON  2,808,727
GYROSCOPE CAGING MECHANISM
Filed Dec. 28, 1955  2 Sheets-Sheet 1

Inventor:
Samuel Gabrielson
by, Richard E. Hosley
His Attorney

Oct. 8, 1957  S. GABRIELSON  2,808,727
GYROSCOPE CAGING MECHANISM
Filed Dec. 28, 1955  2 Sheets-Sheet 2
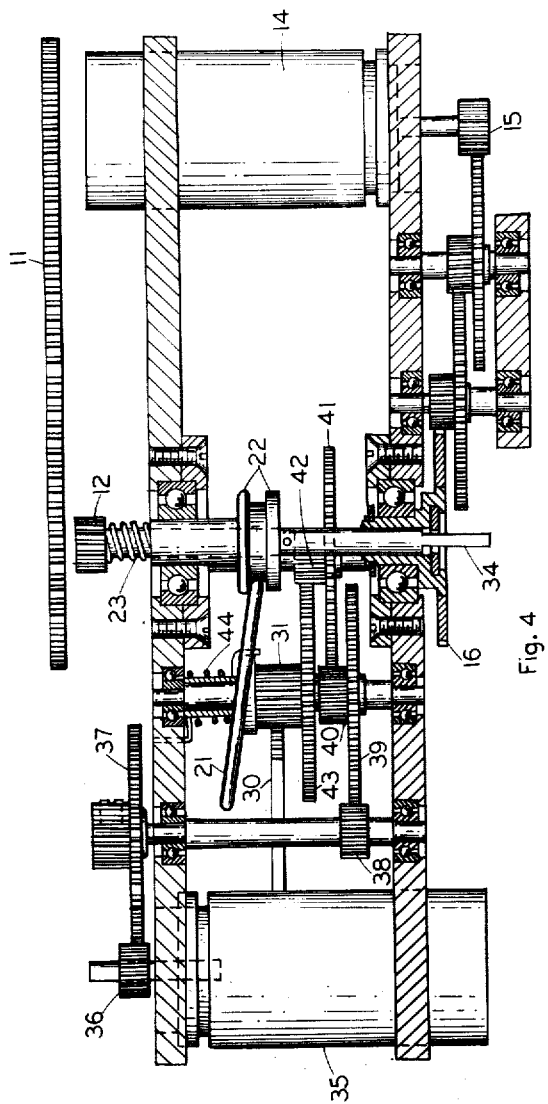
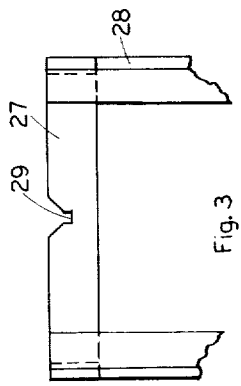
Inventor:
Samuel Gabrielson
by, Richard E. Hosley
His Attorney United States Patent Office 2,808,727
Patented Oct. 8, 1957

2,808,727

GYROSCOPE CAGING MECHANISM

Samuel Gabrielson, Lynnfield, Mass., assignor to General Electric Company, a corporation of New York Application December 28, 1955, Serial No. 555,955

10 Claims. (Cl. 74—5.1)

This invention relates to gyroscopes, and more particularly, to gyroscopic apparatus provided with improved caging mechanisms.

Various gyroscope caging arrangements are known and used which accomplish the caging operation by the application of "brute force" methods. These may take the form of clamping jaws which converge upon the gyroscope or upon some part of it and constrain the gyro to assume a different orientation, often by the application of considerable forces. Torque motors positioned on the major and minor axes are also used which, by the application of simultaneous torques, may compel the gyro into a caged position. The use of these and other "brute force" caging systems to cage a gyro operating at full speed is usually not recommended, since the resistance offered by such a gyro to reorientation may result in large forces being transmitted through delicate suspension bearings and in consequent damage thereto. Consequently, prior caging arrangements have usually been operated only when the gyro rotor is not spinning or when the rotor has not yet reached its full operating speed.

In accordance with this invention, a gyroscope which is restrained to a limited amount of permissible angular movement about its minor axis may be caged while running at high speeds by the application of torques solely about the major axis without danger of damaging any part of the gyroscope. This operation may be accomplished by applying torque about the major axis to force the rotor structure to precess about the minor axis until it reaches the limits of permissible movement about that axis. Thereafter byroscopic rigidity about the major axis is destroyed and the applied major axis torque may then be operative to rotate the rotor structure about the major axis toward a caged position. When in the vicinity of the caged position, the rotor structure may be reoriented about the minor axis by suitable erecting means operable only as a result of the applied major axis torque. In order to permit realization of the sufficiently rapid precessions necessary in a caging system to be employed on a gyroscope operating at full speed, the torque applying means must be capable of exerting forces of reasonably great magnitude. In addition, the precision required of modern gyroscopic systems dictates that the frictions, inertias and dormant locking torques transmitted through the suspension bearings to the rotor structure be kept to an absolute minimum. The utilization of large high torque motors fixed on the gimbals to accomplish rapid caging tends to augment the frictions and inertias of the structure, thereby magnifying the gyroscope errors and destroying much of the accuracy desirable in the system. It is proposed, therefore, to provide a gyroscopic apparatus with a caging mechanism utilizing a conventional unidirectional motor capable of exerting high torques in which the torque exerting means are wholly disengaged from the rotor structure and its supports except during the caging operation.

Accordingly, it is an object of this invention to provide a gyroscopic apparatus with improved caging means which are wholly disengaged and uncoupled from the gyroscope when not in use.

A further object of the invention is to provide an improved compact caging mechanism capable of reorienting a free gyro from any angular disposition it may assume.

Yet another object of this invention is to provide an improved caging mechanism which may be used to cage a gyroscope operating at full speed.

By way of a brief summary of one aspect of this invention, there is provided a gyroscope of the gyrovertical type having a gyro rotor structure suspended in a gimbal for rotation about mutually perpendicular major and minor axes. A gimbal gear is affixed to the gimbal to receive torques transmitted to it about the major axis, while a minor axis torque receiving member in the form of a crank arm is attached to a support rod journalled in the gimbal and supporting the rotor structure for rotation about the minor axis. These two torque receiving means are the only caging elements affixed to the supporting gimbal structure, and are entirely disengaged from the external torque applying apparatus when the gyro is running and uncaged. An axially slidable shaft is provided with a caging pinion at its terminus engageable with the gimbal gear. Through an intermediate gear train, an externally mounted electric motor, when energized, drives the caging pinion into torque applying position by means of a clutch and cam arrangement such as that disclosed in a copending application of Harry G. Swanson for "Gyro Setting Device," Serial No. 471,352, filed November 26, 1954, now Patent No. 2,737,053, issued March 6, 1956, and assigned to the same assignee as that of the present application. The electric motor also applies a torque to the caging pinion through the same gear train. Because of the applied major axis torque, when the gyro rotor is spinning, the rotor structure precesses about the minor axis until it can go no further, prevented from further rotation by stop means affixed to the gimbal and the minor axis shaft. As soon as the stop means engage, the structure loses its inherent gyroscopic rigidity about the major axis and the gimbal turns freely under the force of the torque applied to the gimbal gear.

At the same time the caging pinion is moved into place, a caging bar is shifted into the path of movement of the crank arm so that, with continued turning of the gyro gimbal about the major axis, the crank arm eventually contacts the caging bar. Further rotation of the gimbal forces the crank arm to slide along the caging bar to a central position thereby erecting the rotor structure and placing it in a caged position. When the gyro rotor is not spinning, the sequence of operation is nearly the same, except that precessional movement of the rotor structure is not effected and is, in this instance, unnecessary.

When the caging operation is completed, the electric motor is de-energized and the caging pinion springs quickly out of engagement with the gimbal gear, prevented from exerting transient upsetting torques to the rotor structure about the major axis by a backlash arrangement on its shaft. Simultaneously, the caging bar is withdrawn from contact with the crank arm in a direction perpendicular to the minor axis in order not to transmit additional torques about the minor axis. The rotor structure is, therefore, left in a perfectly caged position within the gimbal.

While the scope of this invention is not to be limited except by a fair interpretation of the appended claims, the details of the invention. as well as further objects and advantages, may be better understood in connection with the drawings wherein:

Figure 3 is a fragmentary view of a detail of Figure 1; and,

Figure 4 represents a cross-sectional view of an alternative embodiment of this invention.

Figure 1:
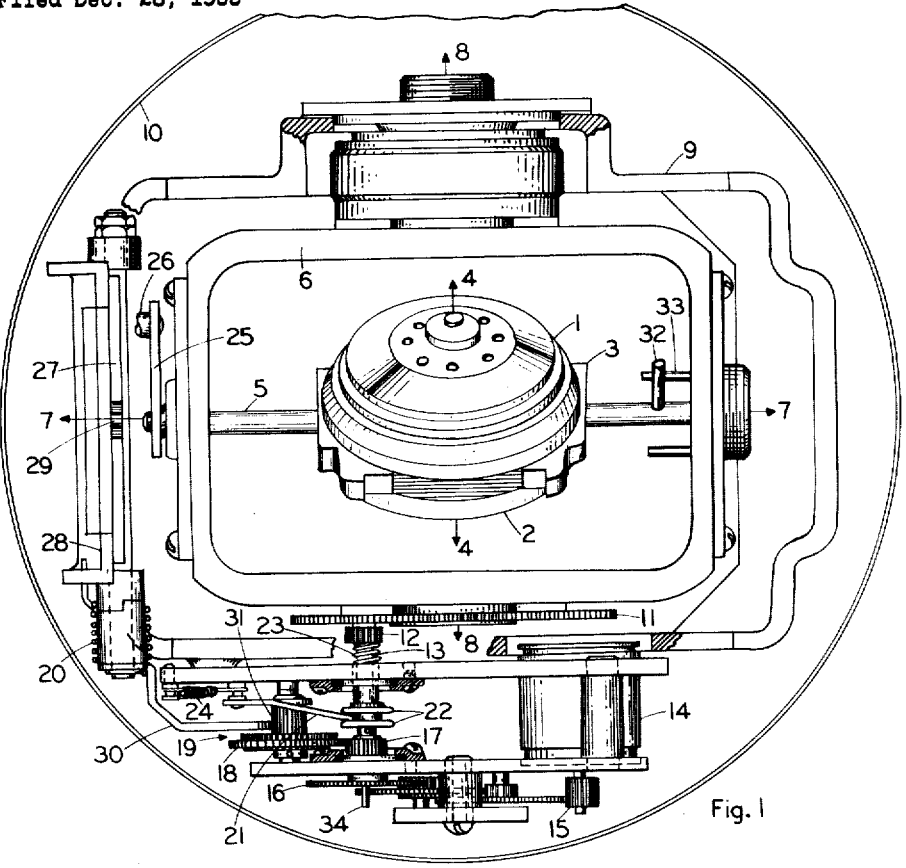
Figure 1 is a top view, partially cut away, of a gyroscope and a caging arrangement constructed in accordance with the principles of this invention showing the gyro rotor structure in precessed position.

There is shown in Figure 1 a rotor structure comprising two symmetrical rotor halves 1 and 2 supported by bearing plate 3 and rotating about spin axis 4—4. The rotor structure is supported by axle 5 which is journalled for rotation in gimbal 6 about minor axis 7—7. The gimbal itself is positioned for movement about major axis 8—8 within supporting framework 9. Dust-tight housing 10 encloses the entire structure. Mounted on the gimbal to receive torques about major axis 8—8 is gimbal gear 11 which is engageable with pinion 12 on axially slidable shaft 13. Unidirectional motor 14 operating through the gear train commencing with pinion 15 and ending with gear 16 operates to rotate caging pinion 12. Mounted on the same shaft as pinion 12 for rotation therewith is pinion 17 which, in cooperation with gear 18 forming part of clutch 19, rotates disc cam 21 a partial revolution against the restraining action of spring 24. Rotation of discs cam 21, through the cooperation of flanges 22, forces pinion 12 upward and into engagement with gimbal gear 11. In order to insure that the caging pinion will mesh freely with the gimbal gear, a resilient coupling between the pinion 12 and the shaft 13 is provided in the form of spring 23. Rigidly mounted on shaft 5 is a torque receiving structure which, in this embodiment, takes the form of a crank arm 25 with crank pin 26 at its terminus freely rotatable with the rotor structure about the minor axis. For purposes of clarity, crank pin 26 is shown cut away in Figure 1. Biased to a poistion out of the path of crank pin 26 is caging bar 27 mounted on support arm 28 and provided at its center with a crank pin receiving notch 29. Caging bar 27 may be urged into a position in the path of crank pin 26 by the cooperation of gear segment 30 with pinion 31 affixed to the same shaft and rotated through the same clutch as disc cam 21.

The operation of the device is as follows: when motor 14 is energized, the shaft 13 is rotated partially, carrying with it pinion 17, which in turn rotates gear 18. Thus, a torque is exerted upon clutch 19 which turns disc cam 21 through a partial revolution against the action of spring 24, thereby forcing pinion 12 into engagement with gimbal gear 11. At this point the resistance offered by spring 24 becomes so great as to prevent disc cam 21 from turning any further and clutch 19 begins to slip. Meanwhile motor 14 is exerting a torque on pinion 12, which torque is transmitted to gimbal gear 11. With the gyro rotor spinning, no movement of gimbal 6 is yet possible because of the gyroscopic rigidity of the system. Hence, motor 14 stalls and the rotor structure begins to precess about minor axis 7—7 carrying with it crank pin 26 until stops 32 and 33 engage preventing further precessional movement of the rotor structure. At this point, since the inherent gyroscopic rigidity about major axis 8—8 is now destroyed, gimbal 6 begins to turn freely under the torque exerted through gimbal gear 11 and motor 14 is no longer stalled. It may be seen, therefore, that each time this operation is carried out, crank pin 26 describes a complex path of movement about the minor axis, as well as the major axis.

Figure 2:
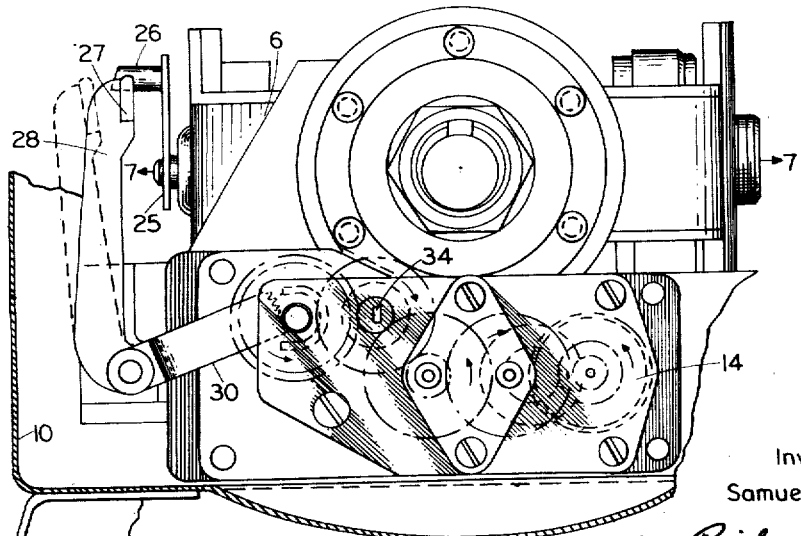
Figure 2 is a side view, partially cut away, of the structure illustrated shown in Figure 1 showing the rotor structure in caged position.

Pinion 31 rotates simultaneously with disc cam 21 and urges gear segment 30 clockwise from the position shown in Figure 2. The rotation of gear segment 30 causes support arm 28 and caging bar 27 to move from their normally inoperaitve position shown in dotted lines on Figure 2 to the position shown in solid lines. Caging bar 27 is therefore in the path of movement of pin 26, and as gimbal 6 continues to turn counterclockwise, as viewed in Figure 2, pin 26 eventually contacts caging bar 27. With further rotation of the gimbal, the pin slides along the rounded top of the caging bar 27, rotating the rotor structure about the minor axis from its position of rest against the stop toward a central, caged position. In the center of caging bar 27 is a notch 29, best seen in Figure 3, defining the central position within which the pin 26 finally settles, resulting in the precise caging of the rotor structure with the spin axis, the major axis, and the minor axis, all mutually perpendicular.

When motor 14 has been energized for a suitable length of time and the gyro is caged, it may then be de-energized either manually or automatically, whereupon disc cam 21 will, under the influence of spring 24, return to the position shown in Figure 1 thereby returning caging pinion 12 and caging bar 27 to their original positions out of engagement with the gyroscope. In order to prevent a reverse torque from being transmitted from disc cam 21 through clutch 19 and pinion 17 to caging pinion 12 during the unmeshing of pinion 12, the shaft 13 is permitted a certain amount of backlash by a loose key and slot arrangement at 34. A flexible spring connection 20 is provided between support arm 28 and gear segment 30 since at the initiation of the caging operation, the gimbal may be in such a position that caging bar 27 will collide with pin 26. In such an event, it can be seen that the crank pin will slip off the face of caging bar 27 and the gimbal will then rotate nearly a full 360° under the applied major axis torque before the caging operation is concluded.

Thus, it can be seen that the gyroscope is caged in a simple straightforward manner without the application of excessive torques. The single limitation on the power of the torque motor is that it be sufficiently strong to enable the precession to be carried out in a reasonable length of time. In effect the gyroscope cages itself, since, when the major axis torque is applied, the rotor structure is permitted first to assume a position in which it offers little resistance to further caging operations, and until the gyro is placed in its final position, gyroscopic rigidity about the major axis remains interrupted. In this connection, it can be seen that although the stops 32 and 33 interrupt gyroscopic rigidity during a large part of the caging, toward the conclusion of the operation crank pin 26 and caging bar 27 perform that operation while the rotor structure is being erected.

Figure 4, in which like reference numerals signify similar parts, represents an alternative embodiment of my invention, wherein motor 14, operating through the gear train commencing with pinion 15 and ending with gear 16, applies a rotational torque to pinion 12 and, thence, to gimbal gear 11. The operation of the device is similar to that illustrated in Figure 1, except that, instead of moving the caging pinion and caging bar into operative position with the same motor 14, an additional motor 35 accomplishes this function. Operating through the gear train identified by the sequential numbering from 36 to 43, motor 35 operates to drive disc cam 21 a quarter revolution against the bias of spring 44 thereby forcing caging pinion into torque applying engagement with the gear 11. Simultaneously, gear segment 30 driven by pinion 31 operates to move the caging bar into position in the manner previously described. When the excitation is removed from motor 35 at the conclusion of the caging operation, spring 44 forces the return of disc cam 21 to the position shown in Figure 4 thereby removing the caging pinion and caging bar from their torque applying positions.

As a further alternative, the motor 35 may be operated to hold the caging pinion and caging bar away from the torque applying positions toward which they would be normally urged by spring 44, instead of to force them into those positions. An advantage of this particular arrangement is that, after the gyroscope is caged and unenergized, the latter arrangement will keep the gyro locked in a caged position until it is needed again, thereby preventing damage to the support bearings. Furthermore, should a power failure occur in the gyroscope system when the gyro is running and uncaged, the caging pinion will spring into engagement with the gimbal gear and operate as a roll brake to prevent spinning about the major axis.

It should be apparent that various changes and modifications of the embodiments shown and described may be made within the scope of these teachings. Thus, for example, the caging bar, while shown as a straight bar, can obviously have other shapes such as that of a cardioid or a V shape. The torque receiving member, too, need not be in the form of a crank arm and pin, but its function could as easily be performed by a flat plate lying in a plane perpendicular to the gyro spin axis and cooperating with an unnotched caging bar. Other arrangements than the disc cam shown can be used to move the caging pinion between operative and inoperative positions, and friction drive means may replace any or all of the gears illustrated.

While particular embodiments of the invention have been shown and described herein, it will occur to those skilled in the art that various other changes, modifications, or substitutions may be made within the scope of the invention as defined in the appended claims.

What I claim as new and desire to secure by Letters Patent of the United States is:

1. Gyroscopic apparatus comprising: a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, first torque means for applying torque in one direction about said major axis, means for energizing said first torque means first to cause said rotor structure to precess about said minor axis until said gyroscopic rigidity is interrupted and then to cause subsequent turning of said gimbal in one direction about said major axis, and second torque means for applying torque to said rotor structure about said minor axis comprising: a torque receiving member mounted for movement with said rotor structure about said minor axis, a caging member mounted separately from gimbal and rotor structure and movable into a first position in the path of movement of said torque receiving member to engage said torque receiving member, the configurations of said members being such that engagement between said members causes said rotor structure to assume a fixed, predetermined attitude when said gimbal is rotated in said one direction about said major axis, means biasing said caging member to a second position out of the path of movement of said torque member, and actuating means operable to urge said caging member into said first position when said first torque means is energized.

2. Gyroscopic apparatus comprising: a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, an electric motor, first torque applying means movable from a position out of engagement with said gyroscope to a position of torque applying engagement with said gyroscope in one direction about said major axis, means for selectively moving said first torque applying means between the aforesaid positions, means coupling said first torque applying means with said motor to receive torque from said motor, second torque means for applying torque to said rotor structure about said minor axis comprising: a torque receiving member mounted for movement with said rotor structure about said minor axis, a caging member mounted separately from said gimbal and movable into a first position in the path of movement of said torque receiving member to engage said torque receiving member, the configurations of said members being such that engagement between said members causes said rotor structure to assume a fixed, predetermined attitude when said gimbal is rotated in said one direction about said major axis, means biasing said caging member to a second position out of the path of movement of said torque member, and actuating means operable to urge said caging member into said first position when said first torque means is in said torque applying engagement with said gyroscope about said major axis.

3. Gyroscopic apparatus comprising: a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, first torque means for applying torque in one direction about said major axis, means for energizing said first torque means first to cause said rotor structure to precess about said minor axis until said gyroscopic rigidity is interrupted and then to cause subsequent turning of said gimbal about said major axis toward a predetermined position of said gimbal, second torque means operating as a result of the applied major axis torque to rotate said rotor structure toward a caged position within said gimbal as said gimbal approaches said predetermined position, whereby further turning of said gimbal toward said predetermined position causes said rotor structure to assume said caged position.

4. Gyroscopic apparatus comprising: a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, first torque applying means for applying torques in one direction about said major axis, means for energizing said first torque applying means first to cause said rotor structure to precess about said minor axis until said gyroscopic rigidity is interrupted and then to cause subsequent turning of said gimbal about said major axis toward a predetermined position, and second torque applying means for applying torques about said minor axis comprising: torque receiving means for receiving torques and transmitting them to said rotor structure about said minor axis, and a torque applying member movable between a non-torque-applying position and a position in which torques are applied to said torque receiving means as said gimbal approaches said predetermined position, and means for moving said member into torque-applying position, whereby further movement of said gimbal toward said predetermined position causes said gyro to rotate to a caged position.

5. Gyroscopic apparatus comprising: a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, first torque applying means for applying torques in one direction about said major axis, means for energizing said first torque applying means first to cause said rotor structure to precess about said minor axis until gyroscopic rigidity is interrupted and then to cause subsequent turning toward a predetermined position, and second torque applying means for applying torques about said minor axis comprising: a member mounted to turn with said rotor structure about said minor axis, a cooperating structure mounted separately from said gimbal and rotor structure and movable between a first position out of the path of movement of said member and a second position within the path of movement of said member, means for causing said cooperating structure to occupy said second position upon energization of said first torque applying means, means for returning said cooperating structure to said first position upon de-energization of said first torque applying means, the configurations of said member and structure being such that as said gimbal approaches said predetermined position said structure engages said member and exerts torques thereon about said minor axis, whereby further movement of said gimbal by said first torque applying means causes said rotor structure to assume a fixed predetermined attitude.

6. A gyroscope mechanism including a gyro rotor structure supported for movement about major and minor axes of rotation, and a setting arrangement for exerting torques about the major and minor axes of said gyroscope comprising: torque-applying means movable between a position in which torques are applied to said rotor structure about said major axis and a position in which no torque is applied to said rotor structure, means resiliently biasing said torque applying means into one of said positions, first actuating means for moving said torque-applying means into the other of said positions, a torque member mounted on said gyroscope for rotation with said rotor structure about said minor axis, a caging member movable between a first position in the path of movement of said torque member to apply torques to said member about said minor axis as a result of the movement of said member about said minor axes as a result of the movement of said rotor structure about said major axis and a second position out of the path of movement of said torque member, means resiliently urging said caging member into one of said positions, second actuating means for moving said caging member into the other of said positions, and electrical drive means for operating said first and second actuating means.

7. A gyroscope mechanism including a gyro rotor structure supported for movement about major and minor axes of rotation, means interrupting gyroscopic rigidity about said major axis when predetermined orientations are assumed by said rotor structure about said minor axis, and a setting arrangement for exerting torques about the major and minor axes of said gyroscope comprising: first torque-applying means for applying caging torques to said rotor structure about said major axis and movable between a torque-applying position and a non torque-applying position, means for biasing said first torque-applying means into one of said positions, first actuating means operable to move said first torque-applying means into the other of said positions, lever means mounted for movement with said rotor structure about said minor axis, a member movable between a position in the path of movement of said lever means to apply torques to said lever means about said minor axis as a result of the movement of said rotor structure about said major axis and a position out of the path of movement of said lever means, means for biasing said member into one of said positions, second actuating means operable to move said member into the other of said positions, and means for operating said first and second actuating means.

8. A gyroscope mechanism including a gyro rotor structure supported for movement about major and minor axes of rotation, means interrupting gyroscopic rigidity about said major axis when predetermined orientations are assumed by said rotor structure about said minor axis, and a setting arrangement for exerting torques about the major and minor axes of said gyroscope comprising: first torque-applying means for applying caging torques to said rotor structure about said major axis, means for resiliently urging said first torque-applying means to a non torque-applying position, first actuating means operable to move said first torque applying means into torque-applying position, lever means mounted on said gyroscope for rotation with said rotor structure about the minor axis, a member movable into a position in the path of movement of said lever means to apply torques to said lever means about said minor axis as a result of the movement of said rotor structure about said major axis, means for resiliently urging said member to a non torque-applying position out of the path of movement of said lever means, second actuating means operable to move said member into torque-applying position with said projection, and electrical drive means to operate said first and second actuating means.

9. A gyroscope mechanism comprising a gyro rotor structure, a first support structure supporting said rotor structure for rotation about a minor axis, a gimbal supporting said support structure for rotation about a major axis, means interrupting gyroscopic rigidity about said major axis when predetermined relative orientations between said gimbal and rotor structure are effected, and caging apparatus for orienting said rotor structure in a predetermined position including first torque-applying means for applying caging torques to said gyroscope about said major axis, and second torque-applying means for applying torques to said gyroscope about said minor axis comprising: lever means attached to said first support structure on said minor axis, a projection mounted on said lever means eccentrically with respect to said minor axis, a bar mounted for movement between positions in and out of the path of movement of said projection, means for urging said bar to a position out of the path of movement of said projection and means for moving said bar into the path of movement of said projection to engage said projection and thereby to exert torques on said gyroscope about said minor axis when said gyroscope is rotated about said major axis by said first torque-applying means.

10. In combination with a gyroscope mounted on an instrument frame and having a rotor structure gimballed for rotation about major and minor axes, the arrangement for exerting torques about said major and minor axes comprising a circular gimbal gear mounted on said gyroscope for rotation with said rotor structure about the major axis, means for supplying rotational power, an axially slidable shaft rotatable by said rotational power means, a pinion fixed with said shaft to apply torques to said gear in one direction about said major axis, means for urging said pinion and shaft to a non torque-applying position, means operable to move said pinion and shaft into torque-applying position, a torque-receiving member mounted on said gyroscope for movement with said rotor structure about the minor axis, a caging member movable into a first position in the path of movement of said torque-receiving member to engage said torque-receiving member and thereby to apply torques to said rotor structure about said minor axis, the configurations of said members being such that engagement between said members causes said rotor structure to assume a fixed, predetermined orientation when said gyroscope is rotated in said one direction about the major axis, means resiliently urging said caging member to a second position out of the path of movement of said torque member, actuating means operable to move said caging member into said first position when said pinion is urged into torque-applying position.

References Cited in the file of this patent

UNITED STATES PATENTS

| | | |
|---|---|---|
| 1,996,896 | Bennett | Apr. 9, 1935 |
| 2,383,663 | MacCallum et al. | Aug. 28, 1945 |
| 2,524,553 | Wendt | Oct. 3, 1950 |

UNITED STATES PATENT OFFICE
CERTIFICATE OF CORRECTION

Patent No. 2,808,727

October 8, 1957

Samuel Gabrielson

It is hereby certified that error appears in the printed specification of the above numbered patent requiring correction and that the said Letters Patent should read as corrected below.

Column 5, line 49, after "from" insert -- said --; column 7, lines 37 and 38, strike out "member about said minor axes as a result of the movement of said"; line 51, after "comprising" strike out the semicolon and insert instead a colon.

Signed and sealed this 9th day of December 1958.

(SEAL)
Attest:

KARL H. AXLINE
Attesting Officer

ROBERT C. WATSON
Commissioner of Patents